United States Patent [19]

Reed et al.

[11] Patent Number: 5,054,412

[45] Date of Patent: Oct. 8, 1991

[54] HYDRODYNAMIC SKIN-FRICTION REDUCTION

[75] Inventors: Jason C. Reed, Hampton; Dennis M. Bushnell, Hayes; Leonard M. Weinstein, Newport News, all of Va.

[73] Assignee: The United States of America as represented by the Administrator of the National Aeronautics and Space Administration, Washington, D.C.

[21] Appl. No.: 429,737

[22] Filed: Oct. 31, 1989

[51] Int. Cl.⁵ .............................................. B63B 1/38
[52] U.S. Cl. .................................. 114/67 A; 114/289; 244/130; 244/199; 244/207
[58] Field of Search ................... 114/67 A, 289, 278; 244/200, 130, 199, 207; 137/8, 13

[56] References Cited

U.S. PATENT DOCUMENTS

| | | | |
|---|---|---|---|
| 1,066,732 | 7/1913 | Johnson | 114/67 A |
| 1,725,452 | 8/1929 | Harper | 114/67 A |
| 2,145,463 | 1/1939 | Spinanger | 114/67 A |
| 3,016,865 | 1/1962 | Eichenberger | 114/67 A |
| 3,604,661 | 9/1971 | Mayer | 114/67 A |
| 4,693,201 | 9/1987 | Williams et al. | 114/67 R |
| 4,736,912 | 4/1988 | Loebert | 114/67 R |
| 4,863,121 | 9/1989 | Savil | 244/200 |
| 4,932,612 | 6/1990 | Blackwelder et al. | 244/200 |
| 4,986,496 | 1/1991 | Marentic et al. | 244/130 |

FOREIGN PATENT DOCUMENTS

| | | | |
|---|---|---|---|
| 752117 | 7/1980 | U.S.S.R. | 137/13 |
| 1300132 | 12/1972 | United Kingdom | 114/67 A |

Primary Examiner—Sherman Basinger
Assistant Examiner—Thomas J. Brahan
Attorney, Agent, or Firm—Kevin B. Osborne; Harold W. Adams

[57] ABSTRACT

A process for reducing skin friction, inhibiting the effects of liquid turbulence, and decreasing heat transfer in a system involving flow of a liquid along a surface of a body includes applying a substantially integral sheet of a gas, e.g., air, immediately adjacent to the surface of the body, e.g., a marine vehicle, which has a longitudinally grooved surface in proximity with the liquid and with a surface material having high contact angle between the liquid and said wall to reduce interaction of the liquid, e.g., water, with the surface of the body, e.g., the hull of the marine vehicle.

12 Claims, 2 Drawing Sheets

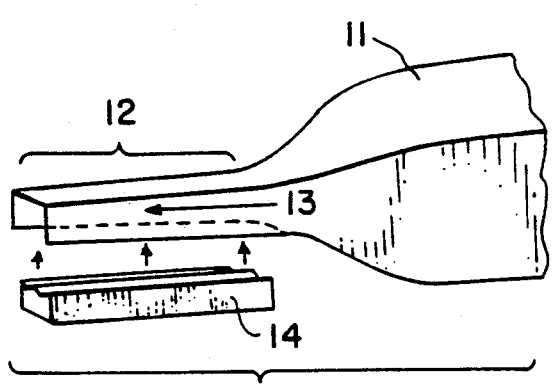
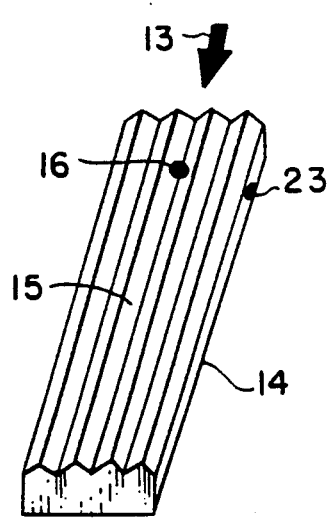
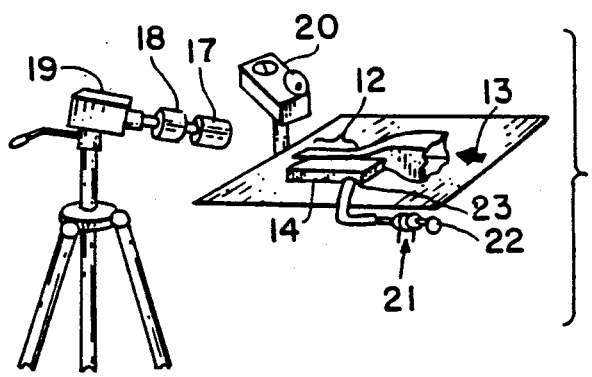
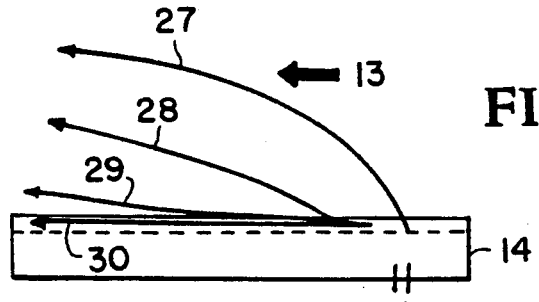
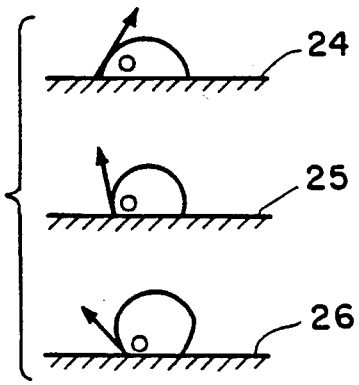
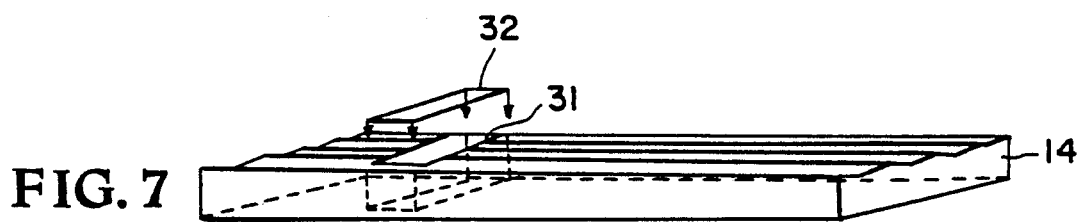

HYDRODYNAMIC SKIN-FRICTION REDUCTION

ORIGIN OF THE INVENTION

The invention described herein was made jointly in the performance of work under a NASA Contract and by an employee of the United States Government. In accordance with 35 USC 202, the contractor elected not to retain title.

BACKGROUND OF THE INVENTION

1. Field of the Invention

This invention relates generally to systems wherein a liquid flows along a surface of a body. It relates particularly to a process for reducing skin friction, inhibiting the effects of liquid turbulence, and decreasing heat transfer in systems wherein a liquid flows along a surface of a body.

2. Description of Related Art

Skin friction drag accounts for a sizable portion of the hull drag for both surface and fully submerged marine vehicles. Reducing this drag component would have the obvious advantages of increased speed and/or efficiency. One approach to skin friction drag reduction involves using a film or discrete layer of air at the wall to take advantage of the greatly lower density of a near wall gas phase to interfere with the momentum transfer mechanism responsible for skin friction.

While various methods of introducing a near wall air layer in water flow have been attempted, a stable, optimized air layer has never been successfully maintained at speed. Some of the most promising results have been achieved by injecting microbubbles into the turbulent boundary layer. McCormick and Bhattacharyya achieved drag reduction on a body of revolution by creating bubbles on the surface by electrolysis. (McCormick, M. E.; and Bhattacharyya, R.: Drag Reduction of a Submersible Hull by Electrolysis. *Naval Engineers Journal*, April, 1973.) More recently, Madavan et al, have completed several studies which yielded microbubble friction reductions. See: Madavan, N. K.; Deutsch, S.; and Merkle, C. L.: Reduction of Turbulent Skin Friction by Microbubbles. *Phys. Fluids*, Vol. 27, No. 11, February, 1984; Madavan, N. K.; Deutsch S.; Merkle, C. L.: The Effects of Porous Material on Microbubble Skin Friction Reduction. *AIAA 22nd Aerospace Sciences Meeting*, January 1984, Reno, Nev. AIAA Paper No. 84-0348.; and Madavan, N. H.; Deutsch, S.; and Merkle, C. L.: Measurements of Local Skin Friction in a Microbubble-Modified Turbulent Boundary Layer. *J. Fluid Mech.*, Vol. 156, 1985, pp. 237-256.

While these large friction reductions in themselves are impressive, microbubble injection has serious complications which prevent it from being totally viable as a full scale drag reduction method. The main concerns are: (a) buoyancy—the tendency for the bubble sheet to migrate out from the wall several tens of boundary layer thicknesses downstream of the injection point, and (b) the large volumetric air flow requirement to achieve significant friction reduction. Due to dispersion effects such as turbulence, buoyancy and viscous lift, the boundary layer must, for all practical purposes, be filled with microbubbles—a condition which at ship hull depths requires prohibitively large amounts of pumping energy. Accordingly, a thin, low volume sheet of air located at the wall where the velocity gradient is largest and the skin friction is produced would be optimum to yield friction reductions on the order of those achieved by microbubble injection but at a significantly lower air flow rate/power requirement. The production of such is the primary object of the present invention.

Madavan et al in "Reduction of Turbulent Skin Friction by Microbubbles," supra, disclose a procedure of introducing microbubbles into a boundary layer. However, they do not comprehend using grooves and/or selecting surface characteristics in order to retain the air at the water and solid interface. Because of dispersion effects such as turbulence, buoyancy, and viscous lift, the air bubbles float away from the boundary surface. Consequently, to ensure a layer of air bubbles at the surface in effect requires filling the entire depth of the hull of a ship with microbubbles. Such a procedure uses a prohibitive amount of pumping energy.

Bushnell in "Turbulent Drag Reduction for External Flows," AIAA Paper No. 83-0227, examines various methods of reducing drag. Bushnell independently discusses the use of riblets and the use of gas bubbles at the boundary layer to reduce skin friction drag. Bushnell, however, does not combine the two to create a grooved surface which more effectively retains a layer of gas.

Walsh, U.S. Pat. No. 4,706,910 discloses a method of reducing drag which uses micro-geometry longitudinal grooving of the flow surface. Walsh differs from the present invention because Walsh uses the grooves themselves to reduce surface drag, whereas the present invention uses surface grooves as a means of retaining gas at a boundary layer. Walsh makes no mention of using gas in combination with the grooves to reduce skin friction drag.

McCormick, U.S. Pat. No. 3,957,008, discloses a method of using electrolysis to generate hydrogen and other gases which are mixed with water in the boundary layer of a ship along the entire wetted surface of the hull thereof. McCormick differs from the present invention in that it makes no use of a grooved surface to more effectively retain air at a boundary layer. Rather, McCormick relies solely on a series of pairs of wires placed transversely along the centerline of the hull. The wires produce gases which mix with water in the boundary layer along the entire wetted surface of the hull, thereby reducing drag. In contrast, the present invention uses grooves and selects surface characteristics in order to more effectively maintain gas at the boundary layer.

SUMMARY OF THE INVENTION

The present invention is a process for reducing skin friction, inhibiting the effects of liquid turbulence, and decreasing heat transfer in systems involving liquid flow along a surface of a body. It has special utility in the development of marine vehicles. According to the present invention, a substantially integral sheet or array of tubes of a gas, e.g., air, is applied adjacent to the surface of a body, e.g., a marine vehicle, to reduce the interaction of liquid, e.g., water, with the surface of the body, e.g., the hull of the marine vehicle. Especially beneficial results are obtained when the following conditions are met: (a) the nature and character of the surface of the body are selected so that the contact or wetting angle of the liquid therewith is at a maximum; and (b) the geometry of the surface of the body is selected so that contact of liquid with the surface occurs over a minimum area. Under these conditions the contact or wetting angle of the liquid is such that the integrity of the gas sheet or tube is maintained in a position adjacent to the surface of the body. In this regard it is especially advantageous if the sheet or tube of gas is applied tangentially to the surface of the body. Moreover, surfaces found to have an especially desirable nature and character are those which have been subjected to a post treatment, such as painting, vapor depositing, or chemical coating to maximize the contact or wetting angle of the liquid therewith. Furthermore, a preferred surface geometry resulting in minimal contact of liquid and surface is one wherein adjacent, longitudinal grooves extend along the entire contact area of the surface, liquid being excluded from these grooves when gas is injected therein.

BRIEF DESCRIPTION OF THE DRAWINGS

For a more complete understanding of the present invention, including its primary object and attending benefits, reference should be made to the Description of the Preferred Embodiments, which is set forth below. This description should be read together with the accompany drawings, wherein:

FIG. 1 is a schematic showing the primary testing facility employed in the practice of the present invention;

FIG. 2 schematically depicts a test model having a grooved surface, which model is mounted in the primary testing facility of FIG. 1;

FIG. 3 is a schematic showing the overall experimental setup employed in the practice of the present invention;

FIG. 4 pictures the variation of contact or wetting angle for three different test model surfaces;

FIG. 6 represents air emission path lines for four different surface conditions on the test model;

FIG. 7 represents an optimized surface configuration for the test model; and

DESCRIPTION OF THE PREFERRED EMBODIMENTS

Figure 5:
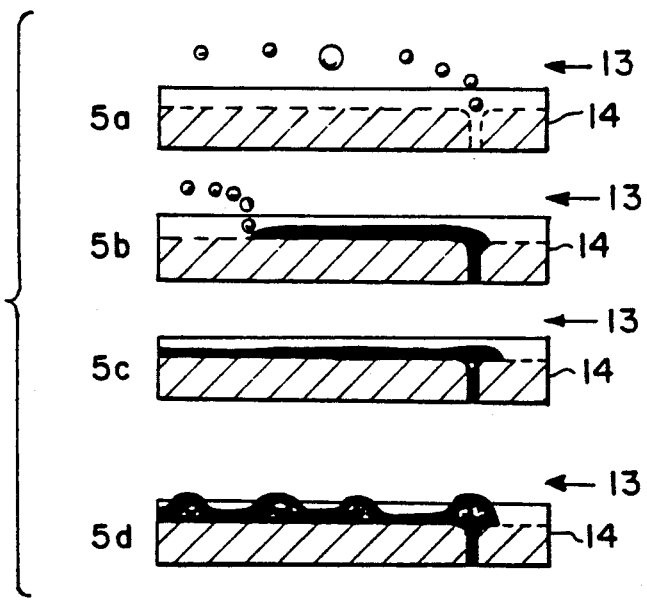
FIG. 5 shows air emission path lines for four different air injection conditions on the test model.

A flow visualization study was made of water flow over grooved surface models with air injection into surface grooves. The effects of groove geometry and surfactants were examined as well as air flow rate. The results show that the grooved surface geometry acts to hold the injected airstream near the wall and in some cases, results in a tube of air attached to the wall.

Groove dimension and the presence of surfactants were shown to greatly affect formation and stability of the air tube in the grooved surface. Deeper grooves, surfactants with high contact angles, and angled air injection increased the stability of the attached air tube. Convected disturbances and high shear were shown to increase the interfacial instability of the attached air tube.

If the air tubes are maintained in turbulent high speed flows, skin friction of marine vehicles would be reduced.

Referring now the drawings, FIG. 1 shows the primary testing facility which consisted of a small open-circuit water tunnel 11 with a clear plexiglass test section 12, which was four inches long and had a one-half inch by one-half inch cross-section. The tunnel configuration is shown in FIG. 1. The tunnel was fed by municipal water and throttled by controlling two three-quarter inch sections of honeycomb with one-quarter inch cells, a compressed section of air conditioner filter to break up the incoming jet and a 16:1 contraction section. Dye injected upstream of the test section showed the flow 13 through the test section to be relatively smooth and laminar. The bottom wall of rectangular test section 12 was replaced by flush mounted test model 14. Test models 14 were made of four inches long by one inch wide aluminum plate, one-half inch thick. See FIG. 2. The surfaces of the models which were exposed to the flow were machined with triangular longitudinal grooves 15 of varying depth and width dimensions. Surfactant coatings of a hydrocarbon base, anti-wetting agent were either topically applied to the aluminum groove surface 15 or the entire model was constructed of Teflon ®, which is available commercially and which has anti-wetting properties. In order to more clearly understand the action of surfactants to alter the interfacial tension or change the surface energy, the contact angle (which corresponds to the relative strength of the solid/liquid and gas liquid interfaces) of a sessile water drop was measured on each of the surfaces tested. Each model 14 had an air injection hole 16 drilled in the valley of the center groove. The injector diameter was nominally one-half groove width. Air was supplied by a regulated compressor and throttled with a needle valve. Because the flow rates were relatively low (between 0 and 200 cc/min.), the volumetric flow rate was measured by displacement of water over a period of one minute in a graduated cylinder.

The overall experimental set up is shown in FIG. 3. Flow visualization was conducted with a telephoto lens 17 mounted to an image intensifier system 18 with the output image coupled to a Vidicon video camera 19. The image intensifier 18 produced a high enough effective gain to allow the video system to operate in low light level stroboscopic conditions. Data were recorded on a Sony U-matic editing, three-quarter inch format VCR. Framing rate was 60-fields per second. Lighting consisted of a strobotach 20 operating at 3600 Hz and less to allow recording of the dynamic bubble sheet behavior. Lighting frequency was synchronized to flow phenomena such as eddies shown by dye injection or bubble emission frequency. Air was supplied by source 21 (e.g., a regulated compressor), throttled by needle valve 22, to air supply post 23. Initial tests were conducted at a water free stream velocity of 4-ft/s. This velocity was chosen because simple laminar flow conditions were desired to better observe the mechanisms of groove/air interactions. The freestream water velocity was also varied in several model tests up to 8-ft/s in order to briefly examine the sensitivity of the groove-/air interaction to velocity. Velocity was measured with a pitot tube which equated dynamic pressure to hydrostatic head. Length Reynolds number at the end of the model was on the order of 90,000. A test run consisted of injecting air at various flow rates and observing the trajectory and dynamics of the bubble sheet/grooved surface interaction. Volumetric flow rate was determined throughout the study at discrete settings which corresponded to groove/air interaction phenomena. In several test sequences, a small diameter cylinder was placed upstream of the model to produce von Karaman eddies that swept the model surface to simulate the effects of flow unsteadiness and turbulence.

The variation of contact angle Θ for different surface materials is illustrated in FIG. 4. Base aluminum 24 has a contact angle Θ of 77° as measured by the drop method. A topical surfactant applied to the surface 25 increases the contact angle Θ to between 86° and 93° Teflon ® 26, depending on the roughness thereof, can have a contact angle Θ varying from 80° to 149°. Using the contact angle Θ as a measure of wetability, it is clear that surfactants can be used to favorably alter the surface tension (or surface energy) relative to bare aluminum.

Referring now to FIG. 5, air injection from a bare aluminum flat plate with an 0.010 inch diameter injector showed that at all airflow rates the injected bubble stream exhibits no tendency to remain near the wall. See FIG. 5a. Air injection from the flat plate with a 0.020 inch diameter injector angled 45° downstream showed the bubble path line to be closer to the plate initially, as the bubbles exited the ejector, but again indicated no tendency for the bubble stream to remain near the wall.

Air injection for nearly every grooved model configuration (with and without surfactant coating) produced a bubble emission path line differing from that of a flat plate and, for some conditions, a continuous tube of air confined in the rib valley. The air tube structure normally ran from the injector downstream to the end of the model. This tube structure was characterized by three different phases of behavior which were a function of air injection rate. See FIGS. 5b, 5c, and 5d. These phases consist of air tube fracturing (5b) when the air injection rate was too low, a stable tube structure within a discrete airflow range (5c), and an erupting behavior (5d) caused by an air injection rate that was too large.

Air injection for a 0.010 inch wide by 0.020 inch deep grooved surface with an 0.008 inch injector showed that the model has a slight attractive effect on the stream of bubbles as they are emitted from the ejector. See FIG. 6. This appears to be due to the attractive force of the grooves causing the bubbles to exit the injector at a lower angle—an effect similar to that achieved by angled injection on the flat plate. Adding surfactant had no major effect for this geometry. Line 27 represents a stream of bubbles from a flat plate; line 28, a stream of bubbles from a flat plate with an angled injector; line 29, discrete bubbles from a grooved surface; and line 30, a captured air tube in a grooved surface.

Air injection from a 20×20 (groove dimensions will be abbreviated hereinafter by showing width followed by height in thousandths of inches) model with a 0.010 inch injector showed the same tendency to redirect the emission angle, but no continuous air tube would attach. For this geometry, coating the surface with a non-wetting surfactant resulted in the ability to trap a continuous air tube in the groove. Fracturing occurred up to volumetric flow rates, Q, of 2 cc/min., and erupting behavior at 6 cc/min. A 20×20 model made of slightly roughened Teflon ® was able to hold a stable tube over a wider range and flow rates from Q=3 cc/min. to Q=17 cc/min, without applying surfactant.

Air injection from a model 20×40 with a 0.010 inch injector produced a stable tube of air from Q=3 cc/min. to Q=44 cc/min. The increased depth apparently increased the surface tension sufficiently to hold the air tube without surfactant. Upon adding surfactant, the surface resulted in the lower threshold of stability, raising to Q=14 cc/min; this appears to be caused by enhanced fracturing due to the greater surface tension provided by the surfactant.

Air injection from a 40×20 model with a 0.020 inch injector diameter did not result in an attached air tube without surfactant. Adding surfactant resulted in a stable tube being established between Q=18 cc/min. and Q=59.5 cc/min. The greater width of this model caused a more pronounced interfacial instability than was observed for the previous models.

For the 40×80 model series, two injection configurations were investigated: one with a standard 0.020 inch injector normal to the surface, and one with the same diameter injector, but angled approximately 45° downstream.

The 40×80 model with normal injection exhibited no separation of the air tube at low Q values, but rather a series of convecting air tube segments. Increasing the airflow rate resulted in a merging of the tube segments, and, finally, erupting behavior began at Q=237 cc/min. The model with 45° angled injection showed similar behavior to the normal injection at low airflow rates, but the onset of erupting was delayed until Q=366 cc/min. As expected, the injector bulge was also noticeably more diffuse than with normal injection. The normal injector model with surfactant maintained a stable tube from Q=15 cc/min. to Q=164 cc/min. The angled injector model had the same lower threshold, but the upper threshold was delayed until Q=234 cc/min.

Tests conducted with an eddy shedding cylinder showed a significant effect of flow unsteadiness on the grooved surface/air interaction. In all the models but the 40×80 series, eddy disturbances prevented the attached air tube from establishing—both with and without surfactant. The addition of surfactant coating to the 40×80 model stabilized the tube to such an extent that the region of tube stability was only slightly smaller with than without the eddy disturbance. The normal injection model was stable from Q=30 cc/min. to Q=150 cc/min. and the angled injection model from Q=30 cc/min. to Q=218 cc/min.

The action of surfactant coatings appears to be quite significant. The ability of surfactants to stabilize the air tube is clear from their action in the 0.020 inch wide model series and also their stabilizing effect on the 40×80 model in the presence of eddy disturbances. The action of surfactants was influenced by smoothness of application and thickness of coating. Rough and/or thick coatings of surfactant could detrimentally affect the air/groove interaction by altering the groove dimensions and/or affecting the airflow through the attached tube.

While the majority of the comparative tests were run at a water velocity of 4 ft/s, most models showed the ability to hold a stable air tube at least up to a water velocity 8 ft/s. This required that the increases in water velocity be matched with an increase in injected airflow.

An attempt was made to optimize the groove/surfactant combination using the 20×40 Teflon ® model. See FIG. 7. The modified air injector was a transverse slot 31, one-eighth inch long in the streamwise direction and running nearly the width of model 14. The slot 31 was covered with a plastic film 32 which slightly overlapped the top of the grooves 15 downstream so that the air was injected parallel to and inside of the grooves 15. It was thus possible to fill the entire exposed groove surface 15 with adjacent air tubes. The resulting stability range extended from very low air flow (with slight fracturing), up to nearly Q=80 cc/min. per individual groove. Eddy disturbances appeared to have no effect for this configuration.

Figure 8:
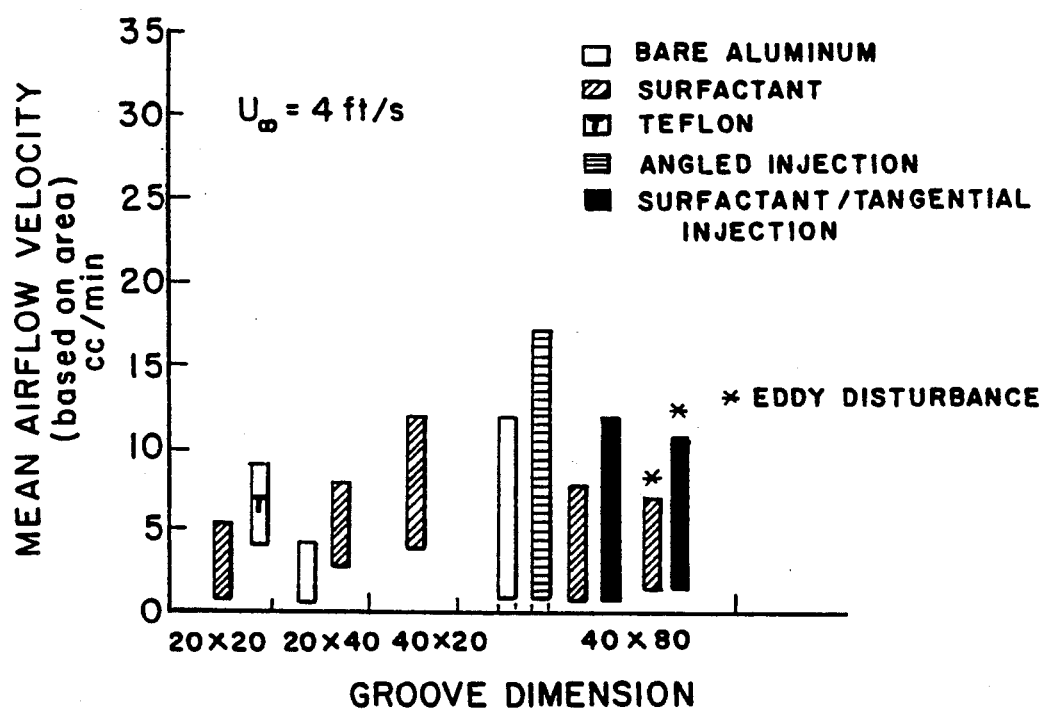
FIG. 8 is a summary plot of mean airflow velocity (based on area) vs. groove dimension for various test models employed.

A summary of the experimental program is shown in FIG. 8 as a bar graph of air tube stability range for the various models tested as a function of average airflow velocity through the groove (using the measured volumetric flow through a groove of given dimensions, and assuming the groove volume is filled to the tips with air). The figure does not include model configurations where a stable air tube was unable to form.

Flow visualization studies of injected air/grooved surface interaction with surface coatings at a mean water velocity of 4 ft/s and injected airflow rates varying from zero to nominally 200 cc/min. have shown that grooved surfaces alter the local surface tension to such an extent that an injected air sheet is attracted and held to the surfaces over a discrete range of airflow rates. The ability of such a grooved surface to hold an air sheet was found to depend on groove geometry and surfactant coating. The general trend uncovered was that the deeper the groove, the stronger the attraction, and the smaller the width, the more stable the gas/liquid interface. Grooves too wide, too shallow, or both, did not hold the injected air in a sheet; grooves too narrow apparently require a larger force to push the airstream into the groove than was locally available from dynamic pressure or interfacial friction.

Anti-wetting surfactants boosted the surface tension force of the grooves to such an extent that an air sheet was held in otherwise unstable conditions. Teflon ®- surfaces enhanced the surface tension attraction of the basic groove geometry even without a topical surfactant, in accordance with the high observed contact angle. Using Teflon ® also avoided problems associated with topical surfactant application.

As expected, changing the angle of injection so that the momentum of the injected airstream is more nearly tangential to the flow extended the range of air sheet stability by distributing the bulge in the air tube caused by injection, thereby delaying the erupting phenomenon. The wide stability range and uniform air sheet covering produced on the surface of the 20×40 Teflon ® slot model with a plastic shroud over the injector further showed the virtues of decreasing or, in this case, eliminating the injector bulge and directing the injected air in a more tangential direction.

Several models tested at various freestream velocities showed that air sheet stability depends on a balance between water flow rate and airflow rate. It is important to note that the results of this study show only the relative effect of groove geometry, surfactants and injection angle; the absolute parameters for air sheet stability will change with liquid velocity (magnitude of interfacial shear) and flow conditions. The effect of eddy unsteadiness disrupting the attached airflow in most configurations gives a clue to the potential problems for such conditions as turbulent boundary layer flow. As velocity is increased, the groove angle will most likely need to be reduced to increase the surface tension force, and perhaps the peak to peak distance must be decreased to address the interfacial stability.

The present invention has been described in detail with respect to certain preferred embodiments thereof. As is understood by those of skill in the art, variations and modifications in this detail may be effected without any departure from the spirit and scope of the present invention, as defined in the hereto-appended claims.

What is claimed is:

1. A method for reducing skin friction, inhibiting the effects of liquid turbulence, and decreasing heat transfer between a contact area of a body surface and a liquid flow, comprising the steps of:
   providing adjacent, longitudinal grooves in the body surface along the entire contact area of the body surface; and
   injecting an individual gas stream into each groove; wherein each longitudinal groove is sized to trap the respective individual stream; whereby an array of gas tubes are formed between the grooves and the liquid flow.

2. The method according to claim 1, further comprising applying a surfactant to the adjacent longitudinal groove, the surfactant having a thickness and roughness which allows the injected gas streams to be trapped within the grooves at increased gas velocities.

3. The method according to claim 1, wherein the gas is injected into each groove at a downstream angle of approximately 45°.

4. The method according to claim 3, wherein the gas is injected into a valley of each groove.

5. The method according to claim 1, wherein the gas is injected at a velocity which is a substantial portion of the velocity of the liquid flow.

6. A mechanism for reducing skin friction between a liquid flow and a contact area of a body surface comprising:
   adjacent, longitudinal grooves formed in the body surface along the entire contact area;
   means for injecting individual gas streams downstream into each of said adjacent, longitudinal grooves, wherein each of said grooves is sized to trap the respective individual gas stream, whereby an array of tubes of gas are formed between the grooves and the liquid flow.

7. The mechanism according to claim 6, wherein a surfactant is applied to said grooves to further reduce the friction between the liquid flow and the contact area, the surfactant having a thickness and roughness which allows the injected gas streams to be trapped within said grooves.

8. The mechanism according to claim 6, wherein said injecting means injects the gas streams at an angle of 45° relative to the contact area.

9. The mechanism according to claim 8, wherein said injecting means injects the gas streams into a valley of each groove.

10. The mechanism according to claim 6, wherein said grooves are triangular.

11. The mechanism according to claim 10, wherein the triangular grooves are arranged such that minimal contact occurs between the liquid and the contact area.

12. The mechanism according to claim 6, wherein said injecting means injects the gas streams at a velocity which is a substantial portion of the velocity of a liquid flow.

* * * * *